(12) United States Patent
Kumar V et al.

(10) Patent No.: US 9,519,661 B2
(45) Date of Patent: Dec. 13, 2016

(54) METHOD AND SYSTEM FOR UPDATING A BACKGROUND PICTURE OF A WEB SEARCH RESULTS PAGE FOR DIFFERENT SEARCH QUERIES

(75) Inventors: Deepak Kumar V, Bangalore (IN); Purshotam Shah, Bangalore (IN); Aby Philip, Bangalore (IN)

(73) Assignee: EXCALIBUR IP, LLC, Sunnyvale, CA (US)

( * ) Notice: Subject to any disclaimer, the term of this patent is extended or adjusted under 35 U.S.C. 154(b) by 240 days.

(21) Appl. No.: 13/448,409

(22) Filed: Apr. 17, 2012

(65) Prior Publication Data

US 2013/0275418 A1    Oct. 17, 2013

(51) Int. Cl.
G06F 17/30    (2006.01)

(52) U.S. Cl.
CPC ... G06F 17/30277 (2013.01); G06F 17/30265 (2013.01); G06F 17/30864 (2013.01)

(58) Field of Classification Search
CPC ............... G06F 17/30867; G06F 17/30905; G06F 17/30554; G06F 17/30696; G06F 17/30991
USPC ......... 707/723, 706, 722, 771; 715/810, 838
See application file for complete search history.

(56) References Cited

U.S. PATENT DOCUMENTS

| | | | | |
|---|---|---|---|---|
| 7,844,591 B1 * | 11/2010 | Lettau | ............... | G06F 17/30265 707/706 |
| 2005/0071776 A1 * | 3/2005 | Mansfield | ............... | G06Q 30/02 715/805 |
| 2007/0266022 A1 * | 11/2007 | Frumkin et al. | ................... | 707/5 |
| 2008/0072293 A1 * | 3/2008 | D'Urso | .............................. | 726/4 |
| 2008/0134093 A1 * | 6/2008 | Dharmarajan | .... | G06F 17/30864 715/838 |
| 2008/0301128 A1 * | 12/2008 | Gandert et al. | .................... | 707/5 |
| 2009/0132943 A1 * | 5/2009 | Minsky | .............. | G06Q 10/0637 715/767 |
| 2009/0248831 A1 * | 10/2009 | Scott | ................. | G06F 17/30265 709/217 |
| 2010/0017438 A1 * | 1/2010 | Haartsen et al. | .......... | 707/104.1 |
| 2011/0314419 A1 * | 12/2011 | Dunn | ................ | G06F 17/30905 715/810 |
| 2012/0210263 A1 * | 8/2012 | Perry et al. | .................... | 715/769 |

(Continued)

OTHER PUBLICATIONS

Aaron D. Campbell, "CSS Trick: Turning a background image into a clickable link";CSS, Developement, Tutorial & Snippets CSS, Design; Nov. 11, 2009.*

*Primary Examiner* — Dennis Truong
(74) *Attorney, Agent, or Firm* — James J. DeCarlo; Greenberg Traurig LLP

(57) ABSTRACT

A method and system for updating a background picture of a web search results page for different search queries. The method includes receiving a search query from a user and determining one or more text search results for the search query. The method also includes determining one or more images for the search query by at least one of extracting the one or more images from webpages associated with the one or more text search results, and extracting the one or more images from an image web search. Further, the method includes assembling the one or more images to create the background picture. Moreover, the method includes rendering the one or more text search results, for the search query, in the web search results page along with the background picture. The system includes one or more electronic devices, a communication interface, a memory, and a processor.

20 Claims, 3 Drawing Sheets

(56) References Cited

U.S. PATENT DOCUMENTS

2012/0290566 A1*  11/2012  Dasher .............. G06F 17/30244
                                                   707/723
2013/0104059 A1*   4/2013  Bennett et al. ............... 715/760
2013/0173570 A1*   7/2013  Bennett et al. ............... 707/706
2013/0187926 A1*   7/2013  Silverstein et al. .......... 345/440
2013/0262430 A1*  10/2013  Thazhathekalam  G06F 17/30265
                                                   707/711

* cited by examiner

METHOD AND SYSTEM FOR UPDATING A BACKGROUND PICTURE OF A WEB SEARCH RESULTS PAGE FOR DIFFERENT SEARCH QUERIES

TECHNICAL FIELD

Embodiments of the disclosure relate to the field of updating a background picture of a web search results page for different search queries.

BACKGROUND

Currently, when a user submits a search query via a search engine, one or more text search results are displayed in a web search results page. However, the web search results page usually has a white or a plain background picture. Further, such a background picture does not enhance user experience.

In light of the foregoing discussion, there is a need for a method and system for an efficient technique to enhance user experience by updating a background picture of a web search results page for different search queries.

SUMMARY

The above-mentioned needs are met by a method, a computer program product and a system for updating a background picture of a web search results page for different search queries.

An example of a method of updating a background picture of a web search results page for different search queries includes receiving a search query from a user and determining one or more text search results for the search query. The method also includes determining one or more images for the search query by at least one of extracting the one or more images from webpages associated with the one or more text search results, and extracting the one or more images from an image web search. Further, the method includes assembling the one or more images to create the background picture. Moreover, the method includes rendering the one or more text search results, for the search query, in the web search results page along with the background picture.

An example of a computer program product stored on a non-transitory computer-readable medium that when executed by a processor, performs a method of updating a background picture of a web search results page for different search queries receiving a search query from a user and determining one or more text search results for the search query. The computer program product also includes determining one or more images for the search query by at least one of extracting the one or more images from webpages associated with the one or more text search results, and extracting the one or more images from an image web search. Further, the computer program product includes assembling the one or more images to create the background picture. Moreover, the computer program product includes rendering the one or more text search results, for the search query, in the web search results page along with the background picture.

An example of a system for updating a background picture of a web search results page for different search queries includes one or more electronic devices. The system also includes a communication interface in electronic communication with the one or more electronic devices. The system further includes a memory that stores instructions, and a processor. The processor is responsive to the instructions to receive a search query from a user, to determine one or more text search results for the search query, to determine one or more images for the search query by at least one of extracting the one or more images from webpages associated with the one or more text search results and extracting the one or more images from an image web search. The processor is further responsive to the instructions to assemble the one or more images to create the background picture, and to render the one or more text search results, for the search query, in the web search results page along with the background picture.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE FIGURES

In the following drawings like reference numbers are used to refer to like elements. Although the following figures depict various examples of the invention, the invention is not limited to the examples depicted in the figures.

DETAILED DESCRIPTION OF THE EMBODIMENTS

The above-mentioned needs are met by a method, computer program product and system for updating a background picture of a web search results page for different search queries. The following detailed description is intended to provide example implementations to one of ordinary skill in the art, and is not intended to limit the invention to the explicit disclosure, as one or ordinary skill in the art will understand that variations can be substituted that are within the scope of the invention as described.

Figure 1:
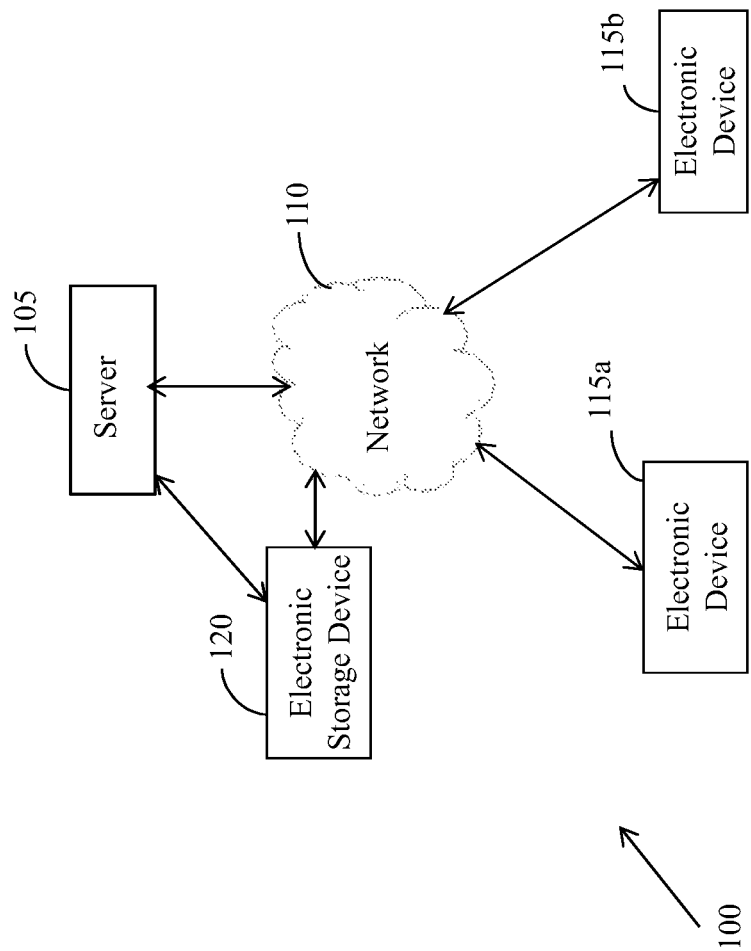
FIG. 1 is a block diagram of an environment, in accordance with which various embodiments can be implemented.

FIG. 1 is a block diagram of an environment 100, in accordance with which various embodiments can be implemented.

The environment 100 includes a server 105 connected to a network 110. The environment 100 further includes one or more electronic devices, for example an electronic device 115a and an electronic device 115b, which can communicate with each other through the network 110. Examples of the electronic devices include, but are not limited to, computers, mobile devices, tablets, laptops, palmtops, hand held devices, telecommunication devices, and personal digital assistants (PDAs).

The electronic devices can communicate with the server 105 through the network 110. Examples of the network 110 include, but are not limited to, a Local Area Network (LAN), a Wireless Local Area Network (WLAN), a Wide Area Network (WAN), internet, and a Small Area Network (SAN). The electronic devices associated with different users can be remotely located with respect to the server 105.

The server 105 is also connected to an electronic storage device 120 directly or via the network 110 to store information, for example search queries, one or more text search results, and one or more images.

In some embodiments, different electronic storage devices are used for storing the information.

The server 105, for example a Yahoo!® server, receives a search query from a user via a search engine. The server 105 determines one or more text search results for the search query. The server 105 also determines one or more images for the search query by at least one of extracting the images from webpages associated with the text search results, and extracting the images from an image web search. The server 105 further assembles the images to create a background picture and subsequently renders the text search results in the web search results page along with the background picture. Hence, on submission of the search query, the user of an electronic device, for example the electronic device 115a, views the text search results in the web search results page along with the background picture.

Figure 2:
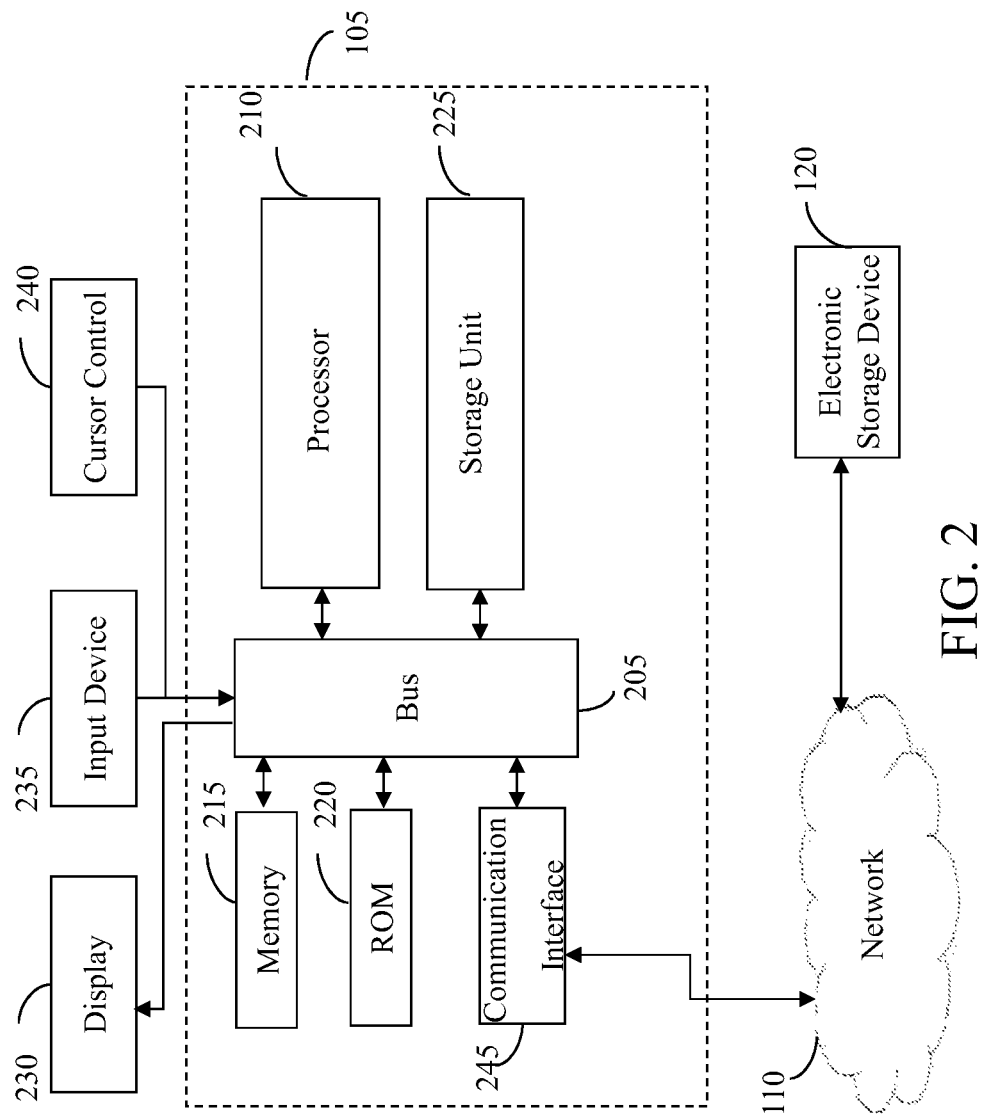
FIG. 2 is a block diagram of a server, in accordance with one embodiment.

The server 105 including a plurality of elements is explained in detail in conjunction with FIG. 2.

FIG. 2 is a block diagram of the server 105, in accordance with one embodiment.

The server 105 includes a bus 205 or other communication mechanism for communicating information, and a processor 210 coupled with the bus 205 for processing information. The server 105 also includes a memory 215, for example a random access memory (RAM) or other dynamic storage device, coupled to the bus 205 for storing information and instructions to be executed by the processor 210. The memory 215 can be used for storing temporary variables or other intermediate information during execution of instructions by the processor 210. The server 105 further includes a read only memory (ROM) 220 or other static storage device coupled to the bus 205 for storing static information and instructions for the processor 210. A storage unit 225, for example a magnetic disk or optical disk, is provided and coupled to the bus 205 for storing information, for example search queries, one or more text search results, and one or more images.

The server 105 can be coupled via the bus 205 to a display 230, for example a cathode ray tube (CRT), and liquid crystal display (LCD) for displaying the webpage. An input device 235, including alphanumeric and other keys, is coupled to the bus 205 for communicating information and command selections to the processor 210. Another type of user input device is a cursor control 240, for example a mouse, a trackball, or cursor direction keys for communicating direction information and command selections to the processor 210 and for controlling cursor movement on the display 230. The input device 235 can also be included in the display 230, for example a touch screen.

Various embodiments are related to the use of the server 105 for implementing the techniques described herein. In some embodiments, the techniques are performed by the server 105 in response to the processor 210 executing instructions included in the memory 215. Such instructions can be read into the memory 215 from another machine-readable medium, for example the storage unit 225. Execution of the instructions included in the memory 215 causes the processor 210 to perform the process steps described herein.

In some embodiments, the processor 210 can include one or more processing units for performing one or more functions of the processor 210. The processing units are hardware circuitry used in place of or in combination with software instructions to perform specified functions.

The term "machine-readable medium" as used herein refers to any medium that participates in providing data that causes a machine to perform a specific function. In an embodiment implemented using the server 105, various machine-readable media are involved, for example, in providing instructions to the processor 210 for execution. The machine-readable medium can be a storage medium, either volatile or non-volatile. A volatile medium includes, for example, dynamic memory, such as the memory 215. A non-volatile medium includes, for example, optical or magnetic disks, for example the storage unit 225. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic media, a CD-ROM, any other optical media, punchcards, papertape, any other physical media with patterns of holes, a RAM, a PROM, and EPROM, a FLASH-EPROM, any other memory chip or cartridge.

In another embodiment, the machine-readable media can be transmission media including coaxial cables, copper wire and fiber optics, including the wires that comprise the bus 205. Transmission media can also take the form of acoustic or light waves, such as those generated during radio-wave and infra-red data communications. Examples of machine-readable media may include, but are not limited to, a carrier wave as described hereinafter or any other media from which the server 105 can read, for example online software, download links, installation links, and online links. For example, the instructions can initially be carried on a magnetic disk of a remote computer. The remote computer can load the instructions into its dynamic memory and send the instructions over a telephone line using a modem. A modem local to the server 105 can receive the data on the telephone line and use an infra-red transmitter to convert the data to an infra-red signal. An infra-red detector can receive the data carried in the infra-red signal and appropriate circuitry can place the data on the bus 205. The bus 205 carries the data to the memory 215, from which the processor 210 retrieves and executes the instructions. The instructions received by the memory 215 can optionally be stored on the storage unit 225 either before or after execution by the processor 210. All such media must be tangible to enable the instructions carried by the media to be detected by a physical mechanism that reads the instructions into a machine.

The server 105 also includes a communication interface 245 coupled to the bus 205. The communication interface 245 provides a two-way data communication coupling to the network 110. For example, the communication interface 245 can be an integrated services digital network (ISDN) card or a modem to provide a data communication connection to a corresponding type of telephone line. As another example, the communication interface 245 can be a local area network (LAN) card to provide a data communication connection to a compatible LAN. Wireless links can also be implemented. In any such implementation, the communication interface 245 sends and receives electrical, electromagnetic or optical signals that carry digital data streams representing various types of information.

The server 105 is also connected to the electronic storage device 120 to store the search queries, the one or more text search results, and the one or more images.

The processor 210 in the server 105, for example a Yahoo!® server, receives a search query from a user via a search engine. The processor 210 determines one or more text search results for the search query. The processor 210 also determines one or more images for the search query by at least one of extracting the images from webpages associated with the text search results, and extracting the images from an image web search. The processor 210 further assembles the images to create a background picture and subsequently renders the text search results in the web search results page along with the background picture. Hence, on submission of the search query, the user views the text search results in the web search results page along with the background picture.

Figure 3:
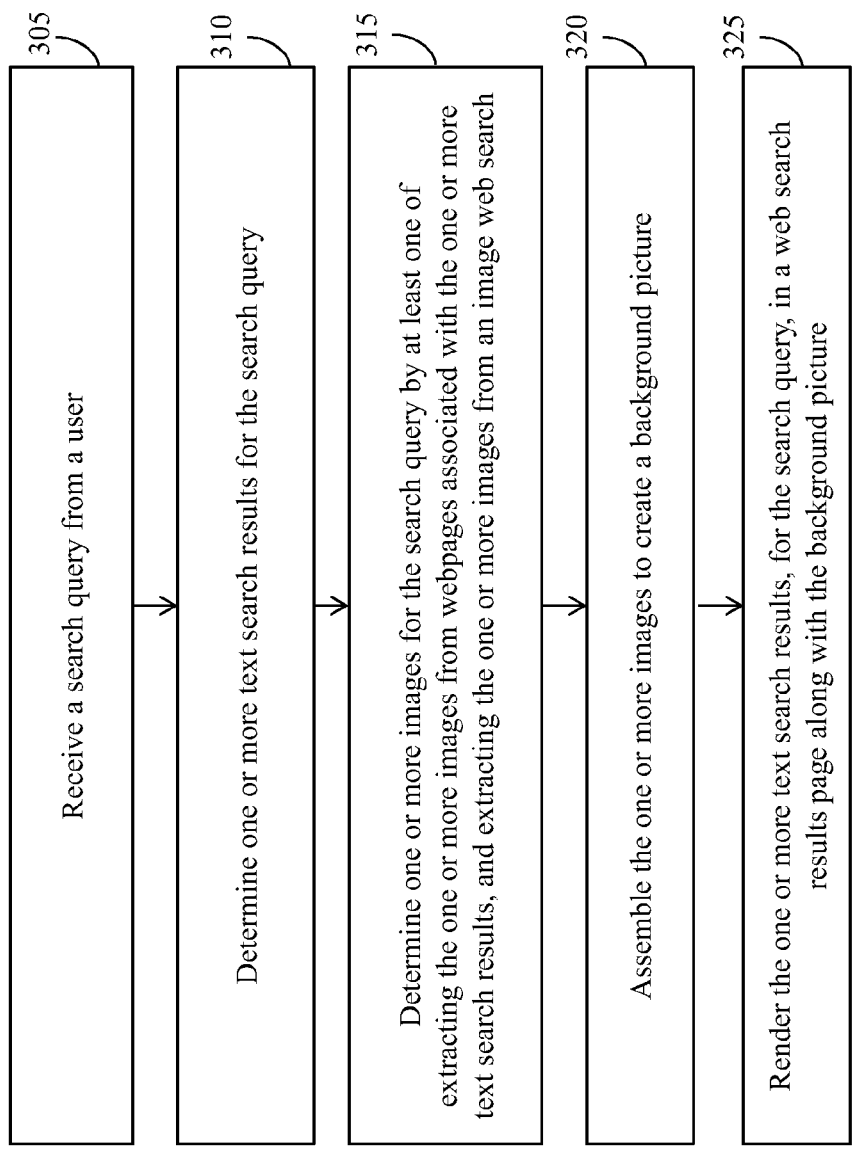
FIG. 3 is a flowchart illustrating a method of updating a background picture of a web search results page for different search queries, in accordance with one embodiment.

FIG. 3 is a flowchart illustrating a method of updating a background picture of a web search results page for different search queries, in accordance with one embodiment.

At step 305, a search query is received from a user. The search query can be submitted by the user via a search engine on a website, for example a Yahoo! search engine on a Yahoo! website.

At step 310, one or more text search results are determined for the search query. The search query is processed by the search engine to determine the text search results. In some embodiments, the text search results are ranked using a ranking algorithm. The text search results are further ordered based on ranking.

In some embodiments, the text search results for the search query can be stored in an electronic storage device, for example the electronic storage device 120.

In other embodiments, the text search results for the search query can be stored in a storage unit, for example the storage unit 225, in a server, for example the server 105. In one example, the server can be a centralized server or a distributed server of Yahoo!®.

At step 315, one or more images are determined for the search query. The images can be determined by one of extracting the images from webpages associated with the text search results, extracting the images from an image web search, or both. The images extracted from the webpages are the images that are displayed when the user clicks corresponding text search results. The images extracted from the image web search are the images that are either relevant or trending for the search query.

In some embodiments, one or more of the images cannot be extracted due to absence of the images from both the webpages associated with one or more of the text search results and the image web search. In this case, such images cannot be determined and are not displayed in the background picture.

In some embodiments, one or more of the images cannot be extracted for one or more of the text search results due to absence of the images from associated webpages. In this case, the images are extracted from the image web search and displayed in the background picture.

In some embodiments, one or more of the images cannot be extracted from the image web search due to absence of the images from the image web search. In this case, the images are extracted from the webpages associated with corresponding text search results.

In some embodiments, the images can be stored in the electronic storage device 120 or the storage unit 225. The images are subsequently retrieved from the electronic storage device 120 or the storage unit 225.

At step 320, the images are assembled to create the background picture. The background picture is a collage of the images extracted either from the webpages associated with the text search results, the image web search, or both. The images are further sized based on ranking of the images from the webpages associated with the text search results, or on ranking of the images from the image web search. Hence, sizing of the images provide the user with trend of each of the images for the search query.

In some embodiments, the images in the background picture are placed in a particular order.

In other embodiments, the images in the background picture are placed randomly.

In some embodiments, if one or more of the images cannot be determined, the background picture is assembled with remaining images. In some embodiments, due to absence of the images from the webpages, the background picture is assembled with the images extracted from the image web search. Similarly, in some embodiments, due to absence of the images from the image web search, the background picture is assembled with the images extracted from the webpages.

At step 325, the text search results, for the search query, are rendered in the web search results page along with the background picture. Hence, on submission of the search query, the text search results are displayed to the user along with the collage of the images as the background picture. User selection of the images is enabled thereby allowing the user to click the images. Based on the user selection, corresponding webpages associated with the images are displayed.

In some embodiments, corresponding images in the background picture are emphasized due to a mouse hover over the images.

In some embodiments, the background picture adapts to fit a screen based on screen resolution for a corresponding electronic device.

In some embodiments, the text search results are displayed in extensible markup language (XML) format or in hypertext markup language (HTML) format.

In some embodiments, the background picture is displayed in Joint Photographic Experts Group (JPEG) format.

The present disclosure updates a background picture of a web search results page for different search queries by assembling one or more images to create the background picture. The present disclosure can also provide a visual representation of trend for a search query as sizing of each image in the background picture is relative to ranking. Hence, the method and system in the present disclosure enables Yahoo! to efficiently use the images to provide the background picture and thereby the visual representation of trend.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A method comprising:
    receiving, by at least one computing device, a search query from a user;
    determining, by the at least one computing device, a search result set by performing a search using the search query, the search result set comprising one or more search results associated with one or more webpages;
    determining, by the at least one computing device, one or more images using at least one search result associated with at least one webpage from the search result set determined from the search performed using the search query;
    using, by the at least one computing device, any of the one or more images determined from the at least one search result associated with the at least one webpage in an assemblage to create a background picture to be rendered as background in a web search results page; and
    communicating, by the at least one computing device and in response to the received search query, the one or more search results in the web search results page comprising the background picture as background created from the one or more images determined from the at least one search result associated with the at least one webpage, wherein each of the one or more images in the background picture is user-selectable to access the at least one webpage associated with the at least one search result used in determining the one or more images.

2. The method as claimed in claim 1, wherein the one or more results are ordered based on ranking.

3. The method as claimed in claim 1, wherein the one or more images are randomly placed in the background picture.

4. The method as claimed in claim 3 and further comprising:
    sizing the one or more images based on one of ranking of the one or more images from the webpages associated with the one or more search results.

5. The method as claimed in claim 4, the sizing the one or more images provides a visual representation of a trend of each of the one or more images for the search query.

6. The method as claimed in claim 1 and further comprising:
    receiving user selection of an image in the background picture, and
    communicating the webpage associated with the selected-image in response to the user selection.

7. The method of claim 1 and further comprising:
    emphasizing the one or more images in the background picture in response to a mouse hover over the one or more images.

8. A non-transitory computer-readable storage medium storing thereon computer-readable instructions that when executed by a processor cause the processor to:
    receive a search query from a user;
    determine a search result set by performing a search using the search query, the search result set comprising one or more search results associated with one or more webpages for the search query;
    determine one or more images using at least one search result associated with at least one webpage from the search result set determined from the search performed using the search query;
    use any of the one or more images determined from the at least one search result associated with the at least one webpage in an assemblage to create a background picture to be rendered as background in a web search results page; and
    communicate the one or more search results in web search results page comprising the background picture as background created from the one or more images determined from the at least one search result associated with the at least one webpage, wherein each of the one or more images in the background picture is user-selectable to access the at least one webpage associated with a search result used in determining the one or more images.

9. The computer-readable medium as claimed in claim 8, wherein the one or more images are randomly placed in the background picture.

10. The computer-readable medium as claimed in claim 9, the instructions further comprising instructions to:
    size the one or more images based on one of ranking of the one or more images from the webpages associated with the one or more search results.

11. The computer-readable medium as claimed in claim 10, the sizing the one or more images provides a visual representation of a trend of each of the one or more images for the search query.

12. The computer-readable medium as claimed in claim 8, the instructions further comprising instructions to:
    receive user selection of an image in the background picture, and;
    communicate the webpage associated with the selected image in response to the user selection.

13. The computer-readable medium as claimed in claim 8, the instructions further comprising instructions to:
    emphasize in the web page the one or more images in the background picture in response to a mouse hover over the one or more images.

14. A system comprising:
at least one computing device, each computing device comprising one or more processors and a storage medium for tangibly storing thereon program logic for execution by the one or more processors, the stored program logic comprising:
  receiving logic executed by the one or more processors for receiving a search query from a user;
  determining logic executed by the one or more processors for determining a search result set by performing a search using the search query, the search result set comprising one or more search results associated with one or more webpages for the search query;
  determining logic executed by the one or more processors for determining one or more images using at least one search result associated with at least one webpage from the search result set determined from the search performed using the search query from at least one of one or more webpages identified in the search result set and from an image web search;
  using logic executed by the one or more processors for using any of the one or more images determined from the at least one search result associated with the at least one webpage in an assemblage to create a background picture to be rendered as background in a web search results page; and
  communicating logic executed by the one or more processors for communicating the one or more search result in the web search results page comprising the background picture as background created from the one or more images determined from the at least one search result associated with the at least one webpage, wherein each of the one or more images in the background picture is user-selectable to access the at least one webpage associated with a search result used in determining the one or more images.

15. The system as claimed in claim 14, wherein the one or more images are randomly placed in the background picture.

16. The system as claimed in claim 15, wherein the one or more images have sizing based on one of ranking of the one or more images from the webpages associated with the one or more search results.

17. The system as claimed in claim 16, wherein the sizing of the one or more images provides a visual representation of a trend of each of the one or more images for the search query.

18. The method as claimed in claim 1, the assemblage further comprising at least one image relevant to the search query identified from an image web search.

19. The computer-readable medium as claimed in claim 8, the assemblage further comprising at least one image relevant to the search query identified from an image web search.

20. The system as claimed in claim 14, the assemblage further comprising at least one image relevant to the search query identified from an image web search.

* * * * *